United States Patent [19]
Biggins

[11] 4,084,949
[45] Apr. 18, 1978

[54] SURGICAL FACE MASK FILTERING MEDIUM

[75] Inventor: Walter F. Biggins, Longmeadow, Mass.

[73] Assignee: The Dexter Corporation, Windsor Locks, Conn.

[21] Appl. No.: 629,501

[22] Filed: Nov. 6, 1975

[51] Int. Cl.$^2$ .............................................. B01D 39/14
[52] U.S. Cl. .......................................... 55/524; 55/527; 162/146
[58] Field of Search .................. 55/524, 527, 528; 210/508, 509; 128/142.6; 162/157 R, 146, 148; 428/147, 288, 296, 426

[56] References Cited

U.S. PATENT DOCUMENTS

| | | | |
|---|---|---|---|
| 2,521,984 | 9/1950 | Lang | 55/528 |
| 3,316,904 | 5/1967 | Wall et al. | 55/528 |
| 3,417,552 | 12/1968 | Dyer et al. | 55/528 |
| 3,521,630 | 7/1970 | Westberg et al. | 128/142.6 |
| 3,632,415 | 1/1972 | Franklin | 210/509 |
| 3,674,621 | 7/1972 | Miyamoto et al. | 162/157 R |
| 3,920,428 | 11/1975 | Kinsley, Jr. | 55/528 |
| 3,951,293 | 4/1976 | Schulz | 55/528 |

*Primary Examiner*—Bernard Nozick
*Attorney, Agent, or Firm*—Prutzman, Hayes, Kalb & Chilton

[57] ABSTRACT

A porous bacteria filter medium of reduced binder content is provided in flexible fibrous sheet form comprised of micron-diameter glass fibers and less than about 30 percent by weight of a polyolefin heat sealable binder fiber randomly dispersed throughout the sheet and fused therein. This filter medium has a bacteria filtration efficiency of at least 96 percent and a porosity in excess of 25 cfm at only two thirds the weight resulting in breathability within comfortable limits over prolonged periods of time. The polyolefin fibers used in the sheet exhibit a surface area greater than 25 square meters per gram and are formed of polymeric material having a molecular weight of 500,000 and a melt index less than 0.5.

9 Claims, No Drawings

SURGICAL FACE MASK FILTERING MEDIUM

BACKGROUND AND SUMMARY OF THE INVENTION

The present invention relates generally to porous bacteria filter media and is more particularly concerned with a new and improved sheet structure comprised of micron-diameter fibers and adapted for use in surgical face masks.

Fibrous sheet structures comprised predominantly of micron-diameter inorganic fibers suitably bonded to provide the necessary strength and structural integrity for use as filtering medium have been known for some time and have conventionally been prepared in accordance with well-known papermaking techniques. Unbonded inorganic filter papers, such as those made exclusively of glass fibers, generally exhibit low strength in a moisture laden atmosphere. This can be attributed at least in part to the straight, smooth-surfaced, rod-like nature of the glass fibers. In order to achieve a prolonged work life, it has been necessary to impart to the glass filter sheets sufficient strength and durability to retain their structural integrity during use. Accordingly, various bonding systems have been employed to achieve the required strength without disturbing the balance between porosity and filtering efficiency.

In the area of surgical face mask filtering media, it is essential that the filter exhibit a high degree of bacteria filtration efficiency, with the conventionally accepted and preferred minimum efficiency being about 96 percent. As will be appreciated, this high filtration efficiency must be coupled with breathability sufficient to permit use of the surgical face mask without undue discomfort to the user. Although the mechanism of bacteria filtration efficiency has not been fully explored, some workers contend that it is associated with the network of fine glass fibers used in the filter and that the interception and retention of bacteria is controlled in large part by the presence of fine diameter fibers, which can form a closely spaced network of fine pores. The presence of binder in the sheet tends to cover over a fraction of the finer pores in this fiber network, and this in turn shifts the pore size distribution of the filter toward the larger size range, thus reducing the filter's efficiency. Others believe it is associated with an electrostatic charge on the micron-diameter glass fibers that attracts and affixes the particles within the sheet structure. The total charge on the filtering medium is believed to be controlled to a limited degree by adjusting the fiber dimension and thereby adjusting the total exposed surface area carrying an electrostatic charge. The charge is controlled predominantly by the amount of fine glass fibers. Under either theory a reduction in the amount of binder used in a filter sheet can result in an improvement in the filtration efficiency at comparable weight levels. Alternatively, a reduction in the basis weight of the filter material could be made while maintaining the requisite bacteria filtration efficiency.

Typical examples of porous inorganic fiber sheet material can be found in U.S. Pat. Nos. 3,253,978 and 3,594,993 although these patents do not refer specifically to surgical face mask filtering media having a high bacteria filtering efficiency. The foregoing patents describe bonding systems wherein nonfibrous bonding agents are incorporated into the web material either during web formation or as a postformation treatment.

Fibrous binder systems using heat sealable fibers, such as vinyl copolymer fibers, e.g. vinyon fibers, have been used for filtering media having surgical face mask application. These all-glass fiber sheets have required the use of a minimum of about 30 percent by weight of vinyon to achieve appropriate sheet machinability and strength. Additionally, difficulty has been experienced with such material due to the low softening point, i.e. about 140°–160° F, of the vinyon fibers resulting in the material adherring to the surface of the hot dryer cans used in the conventional papermaking process. This has tended to cause binder build-up in the dryer section and resulted in frequent shutdown periods during manufacturing runs in order to remove the undesirable build-up from the equipment. Attempts to reduce the amount of vinyon fibers below the 30 percent minimum level have resulted in a substantial loss in strength as well as a reduction in the porosity of the resultant sheet material.

Recently, films and web material have been produced from polyolefin fibers of high molecular weight and low melt index, that is an average molecular weight greater than 200,000 and a melt index of less than 1.0 and preferably less than about 0.5. The fibers, referred to as synthetic wood pulp, are to be contrasted with conventional polymeric staple fibers made by melt spinning operations. These high molecular weight polyolefin fibers cannot be processed to fibers by the conventional spinning technique due to the lack of ready flowability of this material. Instead they are formed by techniques such as shear precipitation. Webs produced from these fibers have been composed predominantly of the polymeric material and usually are fused under appropriate temperature conditions to form thin films. A typical example of such a process can be found in British Pat. No. 1,386,982. However, it has been reported that when these fibers are mixed with papermaking fibers, the tensile strength and apparent density of the resultant product decreases as the polymer fiber content increases.

Accordingly, it is an object of the present invention to provide a new and improved filter medium well suited for use in surgical face masks that permits a substantial reduction in the basis weight of the material without substantially reducing the bacteria filtration efficiency or the breathability of the material. Since the filter medium accounts for about 60 percent of the face mask's total weight, a lighter medium significantly contributes to improved comfort particularly during long surgical procedures.

Another object of the present invention is to provide a new and improved filter medium for surgical face masks that exhibits the aforementioned bacteria filtration efficiency and breathability while reducing the thermoplastic content and basis weight of the material and improving the stiffness of the mask thereby maintaining the mask in a semi-rigid state out of contact with the nose and lips of the wearer to provide increased comfort during use.

Still another object of the present invention is to provide a nonwoven inorganic fiber filter media that permits adjustment in the strength without adversely influencing the porosity and filtration efficiency and facilitates either an increase in the total surface area of the glass fibers within the media or a reduction in the weight thereof while maintaining a high level of bacteria filtration efficiency. Included in this object is the provision for a reduction in the basis weight of the material with its accompanying benefits in both performance and economy of manufacture without sacrificing strength and while achieving additional web rigidity.

A further object of the present invention is to provide a new and improved filter medium of the type described that provides greater processability while obviating binder build-up on the hot dryer cans of the papermaking apparatus and greater control over the fusion characteristics of the heat sealable binder used in the filter medium. Included in this object is the provision for using high molecular weight polyolefin fibers while surprisingly obtaining improved tensile strength and only a minor variation in permeability properties as the amount of polyolefin in the material increases.

Other objects will be in part obvious and in part pointed out more in detail hereinafter.

These and related objects are accomplished in accordance with the present invention by providing a porous bacteria filter medium in flexible fibrous sheet form comprised of inorganic micron-diameter fibers and containing less than about 30 percent by weight of a polyolefin heat sealable binder fiber randomly dispersed throughout the sheet and fused therein. This filter medium has a bacteria filtration efficiency of at least 96 percent and sufficient porosity to permit breathability within comfortable limits over prolonged periods of time. The polyolefin fibers used in the sheet exhibit a surface area of at least 1 square meter per gram and are formed of high molecular weight, low melt index polymeric material.

A better understanding of the invention will be obtained from the following detailed description wherein the article of manufacture possessing the features, properties and relation of elements described and exemplified herein.

DESCRIPTION OF A PREFERRED EMBODIMENT

As is known, single-use disposable surgical face masks are constructed as multilayer laminates that consist of a filtration or filter medium and one or more facing or cover layers of highly porous nonwoven fabric of relatively light weight that contribute little if any filtration properties to the laminate construction. The present invention is concerned with the filter medium used in such disposable surgical face masks.

As mentioned, filter media utilized heretofore have been made by conventional papermaking techniques from microglass fibers bonded with at least 30 percent by weight of low denier vinyon (copolymer of vinyl chloride and vinyl acetate) fibers. In accordance with the present invention the filter media also are fibrous sheet materials wherein the primary or major bacteria filtering fiber component is an inorganic material commercially available in fiber form. For example, typical fiber component materials include glass, quartz, ceramics, asbestos, mineral wool and suitable combinations thereof, all of which may be efficaciously employed. Of course, the preferred fibers are microglass fibers having fiber diameters within the micron range of about 0.2–14.0 microns and preferably 0.5–5.0 microns, i.e. glass fibers falling within the standardized industrial code designations A, AA and AAA. Other fiber components may be included in the sheet in addition to the micron-diameter glass. The filter media preferably is produced by a papermaking technique and therefore the fibers utilized should be capable of forming aqueous dispersions suitable for use on conventional papermaking machines. Accordingly, the fibers are preferably of papermaking length although it will be understood the lengths of the fibers used will also depend on the thickness of the fibers relative to their lengths as well as other processing conditions of the papermaking operation.

As will be appreciated, mixtures of fibers of different sizes are frequently employed in order to achieve the desired filtration efficiency within the filter media as well as the requisite porosity or breathability. Thus the glass fibers having the aforementioned diameters preferably constitute the major fiber component, that is about 75 to 100 percent of the nonbinder fiber content. Coarser fibers are employed in minor amounts to achieve the desired properties such as added reinforcing strength, bulk for pliability within the sheet. These fibers may include synthetic fibers, such as rayon, polyester or similar synthetic fibers, or may involve the use of glass rovings having diameters of about 9 microns and more. Thus, the actual average diameter of the glass fibers may vary substantially so long as a substantial quantity of the fibers exhibit the preferred 0.5–5.0 micron-diameter size.

The sheet material of the present invention generally is made in accordance with conventional papermaking techniques and preferably takes the form of a nonwoven structure wherein the binder fibers interentangle with the nonbinder fibers and provide sufficient structural integrity through simple physical interengagement to permit handling and some machinability of the web material despite a binder fiber content below the 30 percent level employed with vinyon. As is well known, all of the fibers are admixed and thoroughly dispersed in an aqueous medium, frequently at reduced pH levels, by means of a paper mill beater or other mixing devices. The resultant mixture of fiber furnish is then conveyed to the headbox of a papermaking machine where typically it is further diluted and fed onto the continuous fiber accumulating paper-forming wire, such as a Fourdrinier wire. Where pH control is required for possible dispersion of the inorganic or glass fibers, this can be achieved either during the mixing operation or as the fiber furnish is fed to the headbox of the pepermaking machine. Generally when handling inorganic fibers, the pH control is significant and the pH of the furnish is adjusted to a neutral or acidic value prior to the slurry being fed to the headbox.

Although conventional Fourdrinier cylinder-type or other commercially available papermaking machines may be employed, the filter medium of the present invention is most desirably formed in a papermaking machine utilizing an inclined Fourdrinier wire since more dilute dispersions may be used and greater uniformity of sheet structure can be achieved. In such inclined Fourdrinier papermaking machines, the inorganic fiber dispersion is generally maintained at a concentration of about 0.0 to 1.0 percent by weight and preferably at about 0.2 to 0.3 percent by weight. Higher concentrations or consistencies may, of course, be applied on cylinder machines and conventional Fourdrinier machines so long as the resultant nonwoven web material will exhibit the requisite bacteria filtration efficiency and porosity. A typical example of the inclined Fourdrinier wire papermaking machine can be found in U.S. Pat. No. 2,045,095, issued to F. H. Osborne on June 23, 1936. Nonwoven web materials formed on such a machine generally exhibit a desirable three-dimensional network or configuration with only slight orientation in the machine direction.

As mentioned, the binder used for the inorganic fibrous web material is preferably in the form of binder fibers that can be dispersed with the glass fibers prior to deposition on the paper-forming wire. In this way it is possible to achieve good random distribution of the fibers throughout the sheet. The fibers found particularly advantageous in this connection are the polyolefin fibers of high molecular weight and low melt index. These fibers are described in greater detail in the aforementioned British patent specification and in British Patent specification No. 1,386,983. As mentioned in those patents, the essential characteristic of these polyolefin fibers which distinguishes them from conventional polyolefin fibers is their surface area of greater than 1 square meter per gram and their gross morphology, that is their microfibrillar structure similar to wood pulp comprising fibrils which in turn are made up of microfibrils. In general the fibrous polyolefin fibers are of high molecular weight and low melt index such that the polymer cannot be processed into smooth rod-like fibers by the conventional melt spinning technique. These high molecular weight polymeric materials have a melt index of less than about 0.5 or 1.0 and are not adaptable to conventional processing equipment due to their poor flowability characteristics under pressure. These materials preferably have a melt index below 0.1 and an average molecular weight greater than 800,000. In general the polyolefin material should have a viscosity average molecular weight of at least 40,000 and preferably greater than 500,000.

The binder fibers are formed under conditions of shear stress in an apparatus such as a disc refiner. The resultant fibers have a typical size and shape comparable to the size and shape of wood fibers and are commonly referred to as synthetic wood pulp. They have an average length of about 1 millimeter although variations in the manner of their manufacture can result in lengths up to 4 millimeters and more. Of course, shorter fiber lengths are also produced with the lower limit of the fiber length being about 0.025 millimeters with fibers of 0.1 to 0.2 millimeters being more commonly observed as the shortest fibers. These materials are not smooth surfaced cylinders of the type produced by melt spinning. Rather, they have an irregular surface configuration and a surface area in excess of 1.0 square meters per gram and may have surface areas of even 100 square meters per gram. The fibers have a structure which comprises mechanically interentangled bundles of fibrils and macrofibrils, the macrofibrils generally having a width in the range of 1 to 20 microns. Most of the fibers used have a length of 0.2 to 3 millimeters or more. In the case of polyethylene, polypropylene, and combinations thereof, the polymeric material exhibits an average molecular weight between 500,000 and 20,000,000 and a surface area in excess of 1 square meter per gram up to 100 square meters per gram and generally greater than about 25 square meters per gram. Typical examples of these materials are the polyolefins sold by Crown Zellerback Corp. under the designation "SWP", by Solvays and Cie under the designation "PSY" and by Sun Chemical Co. and others.

In producing the filter media of the present invention, the polyolefin binder fiber may be present in amounts from about 5 to about 30 percent by weight without disadvantageously affecting the bacteria filtration efficiency of the resultant material. However, as the amount of polyolefin increases relative to the amount of nonbinder or glass used in the web material, there is a slow but steady reduction in the porosity and increase in the pressure drop of the resultant filter medium. Accordingly, very high amounts, above 30 percent, of polyolefin fiber are not employed in order to ensure breathability of the filter medium within comfortable limits. It has also been found that as the amount of polyolefin fiber increases, the tensile strength of the resultant filter material substantially increases, and therefore the amount of polyolefin used in commercial filter medium is, for practical reasons, a compromise which achieves the highest possible tensile strength and porosity while retaining as high a percent of glass fibers as possible in order to retain the beneficial bacteria filtration efficiency. Accordingly, the preferred range of polyolefin binder fiber is between about 10 and 30 percent by weight for web material.

The fibrous web material formed in accordance with the present invention is typically dried in a conventional manner and subsequently subjected to temperatures of about 265° F and higher so that the binder particles approach and preferably exceed their fusion temperature thereby imparting greater strength characteristics without interferring with the porosity or bacteria filtration efficiency of the web material. As will be appreciated, the melting point of the binder fiber will permit the web material to be dried immediately after formation without disadvantageous melting that might cause binder build-up on the dryer cans of the papermaking machine. This improved processability in turn permits higher manufacturing speeds.

As mentioned, the binder fibers exhibit a gross morphology comparable to wood pulp and includes fibrils and macrofibrils that permit complete dispersion and random distribution of the binder throughout the three dimensional confines of the sheet material. This configuration also permits exceptionally good contact between the binder fibers and the nonbinder fibers and tends to impart substantial internal strength to the sheet-like material at the wet end of the papermaking machine prior to the drying operation. This structural integrity resulting from improved dispersion of the binder fibers and greater contact with many more glass fibers than might be possible in the case of the rod-like vinyon permits the higher manufacturing speeds due to the improved strength of the structure prior to the drying and fusion operation.

As mentioned, the higher melting point of the polyolefin material permits it to pass through the drying section of the papermaking machine without melting. The dried sheet is then heated to a temperature exceeding the melting point of the polyolefin for a brief period of time, i.e. on the order of one minute or less. The fibrilli-form structure of the binder facilitates rapid melting or fusion and at the same time promotes binder adherence to a greater number of individual glass fibers. Thus as the sheet material is subjected to the elevated fusion temperature for a brief period to time, the binder particles fuse and flow onto the glass or nonbinder fibers in a substantially complete fashion so as in essence, to eliminate the fiber structure of the polyolefin. The binder material forms an extremely thin coating, predominantly at the cross over points of the glass fibers resulting in an effective fiber diameter of only slightly greater than the diameter of the glass fibers themselves. As will be appreciated, some small globs of binder will be present at the crossover or connecting points of the individual glass fibers, but in most instances, even these melted and resolidified portions are no larger than the diameters of the glass fibers constituting the bulk of the sheet material. As will be appreciated, this morphology change of the binder assists in retaining the porosity and breathability of the filter medium while substantially enhancing the tensile strength thereof. In this connection it has been found that the porosity should exceed 25 cfm and preferably fall within the range of 44 to 65 cfm while the pressure drop across the medium should not exceed 4.5 mm and will usually fall within the range of 1.5–3.5 mm.

The following examples are given in order that the effectiveness of the present invention may be more fully understood. These examples are set forth for the purpose of illustration only and are not intended in any way to limit the practice of the invention. Unless otherwise specified, all parts are given by weight.

EXAMPLE I

A fiber dispersion was prepared by adding about 100 pounds of high molecular weight, high surface area polyethylene synthetic wood pulp fibers obtained from Crown Zellerbach Corp. as "SWP-grade E-400" and about 400 pounds of microglass fibers to a conventional paper mill beater containing 2,400 gallons of water adjust with hydrochloric acid to a pH value between 2.5 and 3.5. The fiber dispersion was defibered for 5 minutes with the beater roll raised from the bed plate. the microglass fibers comprised 20 pounds of Code AAA glass (0.5–0.7 micron diameter), 80 pounds of Code AA glass (0.7–1.6 micron diameter) and 300 pounds of Code A glass (1.6–2.6 micron diameter).

The fiber dispersion or slurry was then fed to the headbox of a papermaking machine at a consistency of about 2.5 percent, was diluted and deposited on an inclined Fourdrinier papermaking wire in a conventional manner. The web or sheet thus formed was removed and dried on dryer drums at about 220° F following which it was passed through an oven at a temperture of 425° F for a period of 6¼ seconds to cause fusion of the polyethylene and binding of the glass fibers thereby. The resultant web material had a basis weight of 20 pounds per ream and exhibited the physical properties reported in Table I for Example I.

The foregoing procedure was repeated using the same glass fibers in the same relative proportions except that only 70 percent of the fiber content was glass. The remaining fiber content, 30 percent, was vinyon fibers. A sheet having a basis weight of 30 pounds per ream was produced and exhibited the physical properties shown in Table I for "vinyon".

TABLE I

| | Vinyon | Example I |
|---|---|---|
| Basis Weight (#/2880 ft²) | 30 | 20 |
| Porosity (cfm/ft²) | 55 | 45 |
| Tensile MD (g/in) | 185 | 680 |
| CD (g/in) | 60 | 200 |
| % BFE | 97.0 | 98 |
| P (mm H₂O) | 1.75 | 2.5 |

The bacteria filtering efficiency (BFE) of the web was tested using a 24 to 28 hour culture of *Staphylococcus aureus*, Utah Strain 15. The culture was adjusted to a standard optical density so that the average number of viable particles in the control plates fell between 1700 and 2700 particles. The adjusted culture was then diluted and fed to a nebulizer to produce an aerosol. A sample of the filter medium to be tested was placed in an Andersen Sampler so that a circular sample area of three inches was utilized. The aerosol was drawn through the chamber at a flow rate of 28.3 liters per minute for a period of one minute and collected on the plates. All plates were incubated at 37° C for 43 hours and the colonies counted. The filtration efficiency reported in Table I is calculated as a percent efficiency measured against a control plate of the identical culture aerosol.

The pressure drop reported in Table I is a measure of the pressure differential required to draw air at a rate of 8 liters per minute through a test sample having a surface area of 4.9 square centimeters. The pressure drop is a measure of the pressure differential per square centimeter and is expressed as millimeters of water.

As can be seen from the table, the filter medium of Example I exhibited a high rate of bacteria filtration efficiency and improved tensile strength at a substantially reduced basis weight. Although a slight drop in porosity is evidenced, it is still well within comfortable breathing limits and well suited for use in surgical face masks.

EXAMPLE II-V

Using the same code grade proportions of microglass fibers and the same binder fiber as in Example I, several hand sheets were prepared having amounts of binder fiber ranging from 10 to 25 percent. The hand sheets were partially fused at a temperature of 380° F for a period of 30 seconds in a closed oven. The physical properties of the sheet materials thus produced are set forth in Table II. As can be seen from the table, the bacteria filtration efficiency of all samples exceeded the minimum preferred level of 96 percent and the pressure drop remained relatively constant with a slight decrease in porosity as the binder content increased.

TABLE II

| | Ex. II | Ex. III | Ex. IV | Ex. V |
|---|---|---|---|---|
| % SWP binder fiber | 10 | 15 | 20 | 25 |
| Basis Weight (#/2880 ft²) | 19.6 | 20.3 | 21.3 | 20.6 |
| Porosity (cfm/ft²) | 48.4 | 43.2 | 45.3 | 40.0 |
| Tensile (g/in) | 92 | 213 | 289 | 371 |
| % BFE | 96.2 | 97.4 | 96.5 | 97.6 |
| P (mm H₂O) | 2.5 | 2.8 | 2.4 | 3.0 |

EXAMPLE VI

Handsheets were also made according to the procedure of Example IV using polypropylene binder fibers as a replacement for the polyethylene binder fibers. The bacteria filtration efficiency of the resultant sheet material exceeded the minimum level of 96 percent and the porosity was maintained at a level that permitted comfortable breathing through a surgical face mask made from this material.

EXAMPLES VII-IX

Handsheets of gradually increasing basis weight were made according to the procedure of Example IV but replacing some of the microglass fibers with 1.5 denier 3/16 inch rayon and 1.5 denier ¼ inch polyester fibers. The binder was fully fused resulting in the properties set forth in Table III.

TABLE III

| | Ex. VII | Ex. VIII | Ex. IX |
|---|---|---|---|
| Basis Weight (#/2880 ft²) | 22.6 | 27.7 | 32.6 |
| Porosity (cfm/ft²) | 44 | 38 | 34 |
| Tensile (g/in) | 717 | 877 | 1046 |
| % BFE | 96.3 | 98.3 | 98.5 |

TABLE III-continued

|  | Ex. VII | Ex. VIII | Ex. IV |
|---|---|---|---|
| P (mm H$_2$O) | 3.0 | 3.0 | 3.4 |

As can be seen, the increase in basis weight is accompanied by an increase in bacteria filtering efficiency but also a decrease in porosity.

As will be apparent to persons skilled in the art, various modifications, adaptation and variations of the foregoing specific disclosure can be made without departing from the teachings of the present invention.

I claim:

1. A porous bacteria filter medium in flexible fibrous sheet form consisting essentially of thermostable micron-diameter filtering fibers and containing from about 5 to about 30 percent by weight of a hot water insoluble heat sealable thermoplastic polymeric binder in fibrous form having a microfibrillar structure made up of microfibrils similar to wood pulp, said binder fibers being randomly dispersed throughout the sheet and fused to the thermostable fibers at the cross-over points of the thermostable fibers to eliminate its fibrous structure and coat said thermostable fibers to provide an effective fiber diameter only slightly greater than the diameter of said thermostable fibers, said filter medium having a bacteria filtration efficiency of at least about 96 percent and sufficient porosity to permit breathability within comfortable limits, the binder fibers prior to fusion exhibiting an average length of about 1–4 mm, a surface area of at least 1 square meter per gram and being comprised of a high molecular weight, low melt index thermoplastic polymeric material.

2. The filter medium of claim 1 wherein the binder fibers are polyolefin fibers having a surface area greater than 25 square meters per gram.

3. The filter medium of claim 1 wherein the binder fibers are selected from the group consisting of polyethylene, polypropylene and combinations thereof.

4. The filter medium of claim 1 wherein the melt index of the polymeric material is less than 0.5 and the average molecular weight is greater than 800,000.

5. The filter medium of claim 1 wherein the binder fiber content is about 20 percent by weight, the porosity of the medium exceeds 25 cfm and the pressure drop across the medium is less than 4.5 millimeters of water.

6. The filter medium of claim 1 wherein the porosity falls within the range of 44–65 cfm and the thermostable fibers are glass fibers having an average diameter falling within the range of .5 to 2.6 microns.

7. The filter medium of claim 1 wherein the binder fibers are polyolefin fibers comprising up to about 20 percent by weight of the fiber content, said binder fibers having the morphology of wood fibers, a surface area greater than 25 square meters per gram, a melt index less than 0.5 and an average molecular weight greater than 800,000.

8. The filter medium of claim 1 wherein said thermostable fibers are inorganic fibers have a fiber diameter of less than 14 microns.

9. The filter medium of claim 8 wherein said inorganic fibers have an average fiber diameter within the range of 0.5 to 5.0 microns, the melt index of the polymeric material is less than 0.1 and the average molecular weight is greater than 500,000.

* * * * *